United States Patent [19]

Baumgarten

[11] Patent Number: 4,557,396
[45] Date of Patent: Dec. 10, 1985

[54] LID BUTTON WITH A CONTROLLABLE STEAM OUTLET

[75] Inventor: Gerd D. Baumgarten, Wilnsdorf-Wilden, Fed. Rep. of Germany

[73] Assignee: Heinrich Baumgarten KG Eisen- und Blechwarenfabrik, Neunkirchen, Fed. Rep. of Germany

[21] Appl. No.: 560,088

[22] Filed: Dec. 9, 1983

[30] Foreign Application Priority Data

Dec. 9, 1982 [DE] Fed. Rep. of Germany ... 8234578[U]

[51] Int. Cl.[4] .............................................. B65D 51/16
[52] U.S. Cl. .................................... 220/206; 220/367; 251/345; 251/352
[58] Field of Search ............... 220/203, 206, 303, 231; 251/352, 345, 349, 341; 126/389

[56] References Cited

U.S. PATENT DOCUMENTS 2,626,560  1/1953  Burkhardt ..................... 220/203 X
3,047,186  7/1962  Serio ................................ 220/231

FOREIGN PATENT DOCUMENTS 911725   7/1946  France ............................. 220/231
122316   1/1919  United Kingdom .............. 251/352
397265   8/1933  United Kingdom .............. 251/345

Primary Examiner—Allan N. Shoap
Attorney, Agent, or Firm—Flynn, Thiel, Boutell & Tanis

[57] ABSTRACT

A button for a utensil lid includes a blocking member disposed against the lid and a handle part supported on the blocking member. A fastening element extends through the lid, holds the handle part and blocking member in place, and has passageways which provide communication from a chamber in the blocking member to the opposite side of the lid. The blocking element has openings providing communication between the chamber and the region outside the blocking member. A collar encircles the blocking member and is supported for limited rotation thereon, the openings in the blocking member being obstructed and free from obstruction when the collar is respectively in first and second positions relative to the blocking member.

19 Claims, 8 Drawing Figures

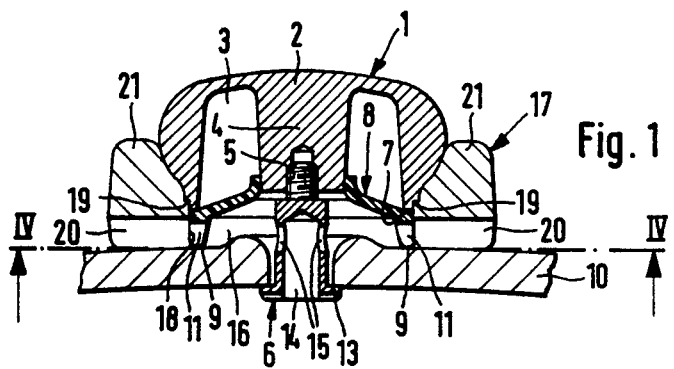
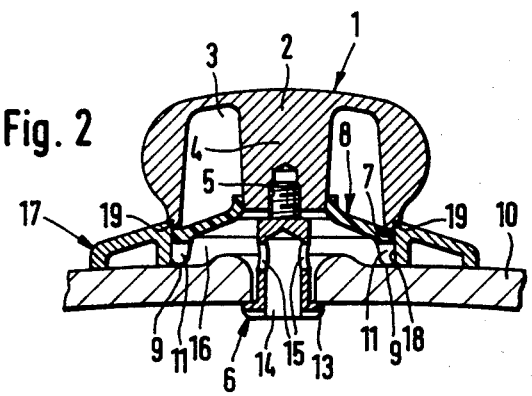
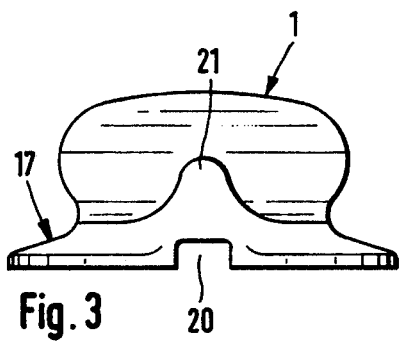
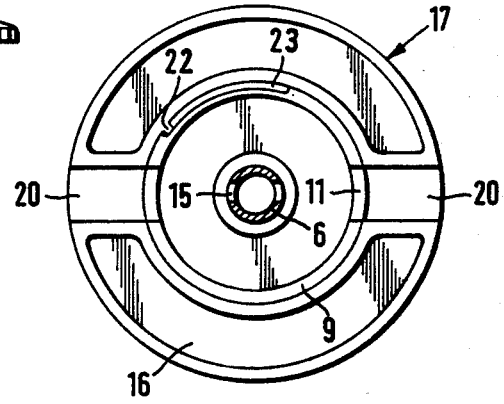

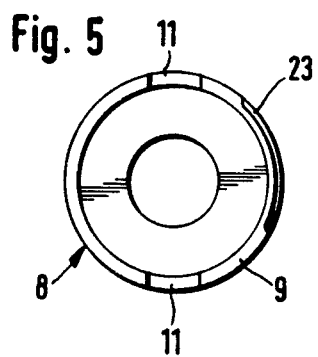
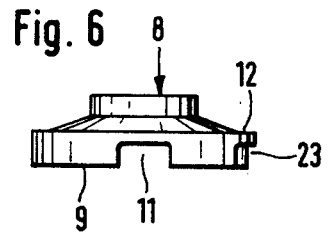
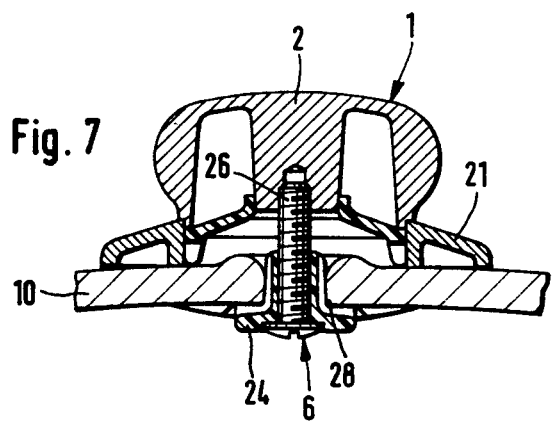
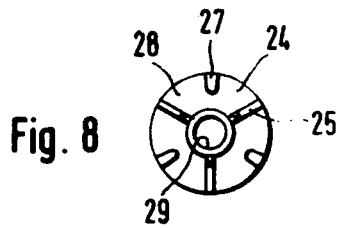

4,557,396

LID BUTTON WITH A CONTROLLABLE STEAM OUTLET

FIELD OF THE INVENTION

This invention relates to a lid button for a utensil and, more particularly, to a lid button which includes a handle part connected to a blocking member by means of a fastening element, the blocking member providing a steam passage through the lid button, and which includes a collar which lies between handle part and the utensil.

BACKGROUND OF THE INVENTION

A lid button of the above-mentioned type has a vent passage which is closed or open, depending on the position of the lid button. In known lid buttons of the above-described type, the steam flows through the fastening element, which is provided with a center bore and serves at the sme time to fasten the lid button on the utensil, into the lid button and from there to the outside through openings which lie laterally in the button. The steam thus enters directly into the handle part, so that the handle part is disadvantageously heated up significantly. Moreover, the aggressive steam destroys the plastic material and leads to premature aging and, possibly, breakage of the lid button. Furthermore, the known lid button is expensive in its construction, because for molding the button multi-part tools are needed and the button must be constructed to be rotatable for permitting selection of the closed or open position.

A basic purpose of the invention is to provide a lid button of the above-mentioned type which is simple in its design, in which a standard handle part can be utilized, and in which the handle part does not have steam flowing through it so that destruction of the lid button by the steam is avoided.

SUMMARY OF THE INVENTION

This purpose is attained by providing a lid button of the above-mentioned type in which the handle part has a receiving arrangement for the fastening element, the blocking member is provided with a seal and support surface which the handle part engages, the handle part and blocking member are fixed against rotation with respect to one another, the blocking member has one or more radially extending openings which communicate with openings in the fastening element, the collar closely encircles the blocking member and has structure about its circumference which can open and close the openings in the blocking member, and the collar is rotatable with respect to the handle part and blocking member.

In the inventively constructed lid button, the handle part and blocking member are fixedly secured on the lid by means of the fastening element, which is perferably a screw. The handle part rests on the blocking member, which is arranged between the utensil and handle part. The blocking member is a part which is separate from the handle part, so that it can be manufactured of a different material than the handle part. The blocking member is preferably manufactured of a thermoplastic material, which separates the steam-passage space from the handle part, which in the usual manner consists of a hard Duroplast. The handle part can thus be a commercially available part. Lateral steam-outlet openings are provided in the blocking member. A collar which can be turned relative to the handle part and blocking member encircles the handle part and, depending on its position, closes off or opens the steam-outlet openings. Through this, it is assured that the steam is discharged parallel to the lid surface so that the operator, during opening and closing of the steam-outlet openings, does not come into contact with the steam.

According to a further suggestion of the invention, the fastening element includes a commercially available screw, and includes a flanged sleeve through which the screw extends and on which rests the screw head. The flanged sleeve is supported in turn with its flange on the lid. The flanged sleeve has channels on its outer side which assure a connection of the space below the lid with the inside of the lid button. The flanged sleeve is provided on its outer side with at least three circumferentially spaced webs which are tapered from the flange toward the other end of the sleeve. The webs are used to center the flange sleeve in the recess of the lid. An advantage of this embodiment is that a commercially available screw is used and in addition a centering of the fastening element in the lid is obtained, which is important because the lid button is designed primarily for glass lids in which the openings for the fastening element are created by burning. Tolerance variations and bulges can thus not be avoided. These tolerances are balanced out in a simple and safe manner by the flange sleeve.

Further advantageous developments of the invention can be taken from the drawings and the description.

BRIEF DESCRIPTION OF THE DRAWINGS

Two exemplary embodiments of the invention are described in greater detail hereinafter in connection with the drawings, in which:

FIG. 1 is a cross-sectional side view of a utensil lid and a lid button embodying the invention;

FIG. 2 is a cross-sectional side view similar to FIG. 1 but with a collar of the lid button turned to a different position relative to the lid button;

FIG. 3 is a side view of the lid button of FIGS. 1 and 2;

FIG. 4 is a cross-sectional view taken along the line IV—IV in FIG. 1;

FIG. 5 is a bottom view of a blocking member which is a component of the lid button of FIG. 1;

FIG. 6 is a side view of the blocking member;

FIG. 7 is a cross-sectional side view of a lid and a further embodiment of a lid button embodying the invention; and FIG. 8 is a top view of a flanged sleeve which facilitates fastening of the lid button of FIG. 7 to the lid.

DETAILED DESCRIPTION

The lid button 1 includes a handle part 2 which is provided with recesses 3 to save material. A tapped hole 5 is provided in a center web 4 of the handle part 2, into which tapped hole is screwed a screw 6. The handle part 2 has a circular bearing surface 7 which engages a blocking member 8. The blocking member 8 is illustrated in a side view in FIG. 6. The blocking member 8 is a cup-shaped member which has its lower circular edge 9 engaging a utensil lid 10. Steam-outlet openings 11 are provided in the lower edge 9 of the blocking member which openings can for example be provided in pairs located on opposite sides of the blocking member 8. Above the edge 9, there is provided a support and seal surface 12 on the blocking member 8 which engages the handle part 2. The handle part 2 is urged against the blocking member 8 which in turn is urged against the utensil 10 by means of the screw 6, which is provided with a flange 13 which engages the underside of the utensil 10, so that handle part 2 and blocking member 8 are fixed against rotation with respect to the utensil 10.

The screw 6 has a center bore 14 which is connected to lateral openings 15 therein, through which steam from the inside of the utensil 10 can enter into a space 16 which is formed between the blocking member 8 and the utensil 10. The steam can exit from the space 16 through the steam-outlet openings 11.

The handle part 2 and the blocking member 8 are surrounded by a collar 17 which has an inner opening 18, the diameter of opening 18 being such that the collar closely encircles the blocking member 8. Furthermore, the collar 17 has a projection 19 which extends under a lip on the handle part 2, so that the collar is fixed against upward movement with respect to the utensil 10. The collar 17 is freely rotatable with respect to the handle part 2 and the blocking member 8, and has on one or on two opposite sides, depending on the number of steam-passage openings 11, openings 20. When the collar 17 is rotated to a position in which the openings 20 in the collar lie opposite the steam-outlet openings 11, then steam from the utensil 10 can exit through the space 16, the steam-outlet opening 11 in the blocking member 8 and the opening 20 in the collar 17.

The collar 17 has one or more shoulders 21 thereon which serve as handles and by means of which an easy turning of the collar relative to the handle part 2 and the blocking member 8 is possible.

The steam which exits from the utensil 10 enters the space 16 which lies between the utensil and the blocking member 8. Since the blocking member is a part which is independent of the handle part 2, it can be manufactured of a plastic which is not affected by hot steam. The steam exits from the handle in a direction parallel to the utensil 10 when the openings 11 and 20 are aligned, so that the handle part 2 can be gripped even when steam is exiting. The handle part 2 thus remains cool, since it does not come into contact with the steam.

The collar 17 has furthermore a shoulder 22 which is movably received in an arcuate recess 23 in the blocking member 8. This recess has its length selected so that the movability of the collar relative to the handle part is limited, namely so that the two end positions of the collar correspond to the closed or open position for the steam escape.

In the exemplary embodiment which is illustrated in FIGS. 7 and 8, similar parts are provided with the same reference numerals. This exemplary embodiment differs from the one according to FIGS. 1 to 7 in that the fastening element 6 includes a screw 26 and a flanged sleeve 24, the screw head engaging the flange of the flanged sleeve. The screw 26 is again screwed into the handle part 2. The flange sleeve 24 has, aside from a center bore 29, three webs 25 which taper upwardly and are used for centering the flanged sleeve in the utensil 10. To reinforce the flanged sleeve, it has furthermore three nubs 27 which engage the underside of the utensil lid and assure that an unhindered passage of air from the underside to the upper side of the lid is effected.

The advantage of this type of fastening is that a commercially available screw is used and that the flanged sleeve is used to permit compensation for diameter tolerances in the bore provided in the utensil 10, thus assuring economical manufacturing and a secure seating of the handle 1. The flanged sleeve can be advantageously manufactured of a durable thermoplastic material.

I claim:

1. A lid button for a utensil lid, comprising a handle part connected by a fastening element to a blocking member which engages said utensil lid and defines part of a steam passage through said lid button, said fastening element extending through an opening provided in said utensil lid and engaging said utensil lid on a side thereof remote from said handle part, and including an annular collar which closely rotatably encircles said blocking member between said handle part and said utensil lid, said handle part having receiving means which receives and securely holds a portion of said fastening element, said blocking member having a seal and support surface which said handle part engages and said handle part and said blocking member being fixed against rotation with respect to one another, said blocking member having at least one radially extending channel therethrough which communicates with a connecting channel in said fastening element which provides fluid communication between opposite sides of said utensil lid, said annular collar having portions about its circumference which, in response to rotation of said collar, can selectively permit and obstruct fluid flow through said channel in said blocking member, said collar being freely rotatable with respect to said handle part and said blocking member, wherein said receiving means includes a threaded opening in said handle part, and wherein said fastening element includes a screw which threadedly engages said threaded opening in said handle part and a flanged sleeve which encircles said screw, and has said connecting channel therein.

2. The lid button according to claim 1, wherein said flanged sleeve has a plurality of angularly spaced, upwardly tapering webs on its outer side.

3. The lid button according to claim 1, wherein said flanged sleeve has plural nubs on an inner side of its flange.

4. The lid button according to claim 1, wherein said blocking member is cup-shaped and has a plurality of radially extending channels in its sidewalls at angularly spaced locations.

5. The lid button according to claim 1, wherein said collar is provided with a shoulder which is received in an annular recess provided in said handle part.

6. The lid button according to claim 1, wherein said collar has a plurality of radially extending openings therethrough at angularly spaced locations.

7. The lid button according to claim 1, wherein said blocking member and said collar are made of a heat-resistant and steam-resistant material.

8. A lid button for a utensil lid, comprising:
a fastening element having a first portion which engages one side of said lid, having a second portion which extends through an opening provided in said lid, and having means defining a first channel therein which provides fluid communication between opposite sides of said lid;
a handle part which is separate from said fastening element and is disposed on a side of said lid opposite said one side thereof, said handle part being spaced from said lid and being fixedly secured to an end of said second portion of said fastening element;

an annular blocking element which is separate from said fastening element and said handle part, said blocking element encircling said second portion of said fastening element and being firmly clamped between said handle part and said lid, said fastening element, said handle part and said blocking element being fixed against rotation with respect to each other and with respect to said lid, said blocking element having thereon a radially outwardly facing peripheral surface and having means defining a second channel which extends thereinto from said peripheral surface and is in fluid communication with said first channel in said fastening element; and an annular collar which is separate from said fastening element, said blocking element and said handle part, said annular collar closely encircling and being rotatably supported on said peripheral surface of said blocking element and having a generally radially extending opening therethrough, said collar being movable between a position in which said opening is angularly aligned with said second channel in said blocking element and facilitates fluid communication between said second channel and a location external to said lid button and a position in which said collar obstructs fluid flow through said second channel in said blocking element.

9. The lid button according to claim 8, wherein the central opening through said blocking element has a cross-sectional size greater than that of the portion of said fastening element which said blocking element encircles, said fastening element being free of engagement with said blocking element.

10. The lid button according to claim 9, wherein said handle part has a recess in a side thereof facing said utensil lid and has a projection which extends into said recess in a direction toward said utensil lid, said projection being snugly received in the central opening through said blocking element and having a threaded opening at an end thereof nearest said utensil lid, and wherein said second portion of said fastening element has at said end thereof remote from said lid a threaded portion which engages said threaded opening in said projection.

11. The lid button according to claim 8, wherein said handle part has a threaded opening in a surface thereof facing said utensil lid, wherein said second portion of said fastening element includes a cylindrical element which extends through said opening in said lid and a threaded stud which is fixedly secured to a first end of said cylindrical element and engages said threaded opening in said handle part, wherein said first portion of said fastening element is an annular flange which extends radially outwardly from a second end of said cylindrical element remote from said first end and is disposed against said one side of said utensil lid, and wherein said means defining said first channel in said fastening element includes a first bore which extends axially into said cylindrical element from said second end thereof and a generally radially extending second bore which communicates with an inner end of said first bore and with said second channel.

12. The lid button according to claim 7, wherein said blocking element is approximately cup-shaped and includes an annular first wall portion which is concentric with and spaced radially outwardly from said second portion of said fastening element and a frustoconical second wall portion which extends axially away from said utensil lid and radially inwardly from an axial end of said first wall portion remote from said utensil lid, said second channel extending radially through said first wall portion.

13. The lid button according to claim 12, wherein said annular collar has an annular surface portion thereon which faces and slidably engages said utensil lid, has on an opposite side thereof an annular surface portion which faces away from said utensil lid and slidably engages an annular surface portion provided on said handle part, and has at least one manually engageable shoulder thereon which projects axially away from said lid.

14. The lid button according to claim 13, wherein said fastening element has a plurality of said second bores therein at angularly spaced locations, each said second bore communicating with the annular space between said second portion of said fastening element and said first wall portion of said blocking element, wherein said blocking element has a plurality of said channels through said first wall portion thereof at angularly spaced locations, and wherein said annular collar has a plurality of said channels therethrough at angularly spaced locations, said annular collar being movable to a position in which each said channel therethrough is angularly aligned with a respective one of said channels through said first wall portion of said blocking element.

15. The lid button according to claim 8, wherein said handle part has a threaded opening in a side thereof facing said utensil lid, and wherein said fastening element includes a screw and a sleeve which encircles said screw, said sleeve extending through and having a diameter less than that of said opening through said utensil lid, and having a plurality of angularly spaced, outwardly projecting ribs thereon which each have a radially outer portion engaging an edge of said opening through said utensil lid, said first channel being the region between an adjacent pair of said ribs, said screw having a head which is disposed against an end of said sleeve remote from said handle part and having a shank which extends through said sleeve and is threaded at an end thereof remote from said head, said threaded end of said screw engaing said threaded hole in said handle part.

16. The lid button according to claim 15, wherein said ribs each taper radially inwardly in an axial direction toward said handle part.

17. The lid button according to claim 16, wherein said blocking element is approximately cup-shaped and includes an annular first wall portion which is concentric with and spaced radially outwardly from said second portion of said fastening element and a frustoconical second wall portion which extends axially away from said utensil lid and radially inwardly from an axial end of said first wall portion remote from said utensil lid.

18. The lid button according to claim 17, wherein said annular collar has an annular surface portion thereon which faces and slidably engages said utensil lid, has on an opposite side thereof an annular surface portion which faces away from said utensil lid and slidably engages an annular surface portion provided on said handle part, and has at least one manually engageable shoulder thereon which projects axially away from said lid.

19. The lid button according to claim 18, wherein said blocking element has a plurality of channels through said first wall portion thereof at angularly spaced locations, and wherein said annular collar has a plurality of channels therethrough at angularly spaced locations, said annular collar being movable to a position in which each said channel therethrough is angularly aligned with a respective one of said channels through said first wall portion of said blocking element.

* * * * *

UNITED STATES PATENT AND TRADEMARK OFFICE
CERTIFICATE OF CORRECTION

PATENT NO.　: 　4 557 396

DATED　　　　: 　December 10, 1985

INVENTOR(S) : 　Gerd D. Baumgarten

It is certified that error appears in the above-identified patent and that said Letters Patent is hereby corrected as shown below:

Column 5, Line 61; Change "7" to ---11---.

Signed and Sealed this

First Day of July 1986

[SEAL]

*Attest:*

DONALD J. QUIGG

*Attesting Officer*　　　*Commissioner of Patents and Trademarks*